United States Patent [19]

Hsieh

[11] Patent Number: 5,238,993
[45] Date of Patent: Aug. 24, 1993

[54] PRIMER COMPOSITION FOR IMPROVING THE BONDING OF URETHANE ADHESIVES TO ACID RESISTANT PAINTS

[75] Inventor: Harry W. S. Hsieh, Edison, N.J.

[73] Assignee: The Dow Chemical Company, Midland, Mich.

[21] Appl. No.: 955,763

[22] Filed: Oct. 2, 1992

[51] Int. Cl.$^5$ ............................................. C08L 75/00
[52] U.S. Cl. ..................................... 524/726; 524/727; 524/700; 525/440; 528/18; 528/26; 528/28
[58] Field of Search ....................... 524/726, 727, 700; 525/440; 528/18, 26, 28

[56] References Cited

U.S. PATENT DOCUMENTS

| | | | |
|---|---|---|---|
| 3,152,162 | 10/1964 | Fischer et al. | 260/453 |
| 3,459,584 | 8/1969 | Caldwell | 117/72 |
| 3,707,521 | 12/1972 | De Santis | 260/37 |
| 3,779,794 | 12/1973 | De Santis | 117/72 |
| 4,020,049 | 4/1977 | Rinehart | 260/75 |
| 4,224,376 | 9/1980 | Ishige et al. | 428/310 |
| 4,418,188 | 11/1983 | Smith et al. | 528/274 |
| 4,511,626 | 4/1985 | Schumacher | 428/425.6 |
| 4,525,511 | 6/1985 | Kirby et al. | 524/158 |
| 4,643,794 | 2/1987 | Saracsan et al. | 156/310 |
| 5,115,086 | 5/1992 | Hsieh | 528/272 |

Primary Examiner—Maurice J. Welsh

[57] ABSTRACT

In one aspect, this invention is a primer comprising a solution of: (a) a polyester resin of a carboxylic acid and a glycol; (b) a polymethylene poly(phenyl isocyanate), diphenylmethane diisocyanate, or mixture thereof; and (c) a silane-containing moiety; in a solvent mixture comprising: (i) a high boiling polar solvent; (ii) an oxygenated solvent; and (iii) an aromatic solvent; wherein the weight ratio of (a):(b) is in the range of from about 0.25:1.0 to 2.0:1.0. In a second aspect, this invention is a primer comprising a solution of: (a) 5–50% of a polyester resin of a carboxylic acid and a glycol; (b) 5–50% of a polymethylene poly(phenyl isocyanate), diphenylmethane diisocyanate, or mixture thereof; (c) 0.1–50% of a silane-containing moiety; (d) 0.1–50% of a high boiling polar solvent; (e) 10–70% of an oxygenated solvent; and (f) 1–50% of an aromatic solvent. It has been discovered that the primer of the invention advantageously provides improved adhesion characteristics of metal-to-glass bonding when used to prime acid resistant paint-coated metal substrates before applying a urethane adhesive, particularly when used with a "fast cure" adhesive comprising an isocyanate-functional prepolymer and dimorpholinediethyl ether.

26 Claims, No Drawings

PRIMER COMPOSITION FOR IMPROVING THE BONDING OF URETHANE ADHESIVES TO ACID RESISTANT PAINTS

BACKGROUND OF THE INVENTION

This invention relates to a primer composition for priming a substrate surface to increase the adhesion of a sealant composition to such a surface. More particularly, this invention relates to a primer composition for priming a substrate surface which has been coated with an acid resistant coating or paint to increase the adhesion of a sealant composition to such a surface.

Urethane sealants and adhesives are known to provide high tensile and tear strengths when used to bond materials. Such sealants and adhesives are especially suitable for use in automobile manufacture for the bonding of a windshield to an automobile body, wherein the cured adhesive imparts additional structural integrity to the automobile body. However, some urethane sealants do not sufficiently bond glass to painted metal without the use of a paint primer to prepare the paint surface. Recently, the coatings industry developed acid resistant paints for use on automobiles to protect them from acidic environmental fallout such as sulfur dioxide from coal burning power plants, bird droppings, and insect fluids. The use of primers for improving the bonding of glass to painted surfaces is known and described, for example, in U.S. Pat. No. 4,525,511 which discloses a primer comprising a film-forming resin and a strong acid. U.S. Pat. No. 4,643,794 describes a primer for bonding to both glass and metal surfaces which comprises 10 to 20 parts polyester resin, 4 to 5 parts polyisocyanate cross-linking agent, 3 to 9 parts carbon black, and 66 to 83 parts volatile solvent. However, although such a primer is adapted for use on both glass and painted surfaces, it is often preferable to use different primers for priming the metal substrate and the glass which have optimum adhesion characteristics for their particular use in order to meet stringent federal motor vehicle safety standards when such a primer is used to bond windshields in automobiles. Further, it is not especially cumbersome to use multiple primer products during a glass installation process since separate applications of primer to glass and primer to paint are still necessary when a paint primer is used. The aforementioned primers were developed for use with base coat/clear coat paint systems and do not work well on newly developed acid resistant paints. Therefore, paint primers capable of adhering to acid resistant paint surfaces are desirable.

SUMMARY OF THE INVENTION

In one aspect, this invention is a primer which comprises a solution of:
 (a) a polyester resin of a carboxylic acid and a glycol;
 (b) a polymethylene poly(phenyl isocyanate), diphenylmethane diisocyanate, or mixture thereof; and
 (c) a silane-containing moiety;
in a solvent mixture comprising:
 (i) a high boiling polar solvent;
 (ii) an oxygenated solvent; and
 (iii) an aromatic solvent;
wherein the weight ratio of (a):(b) is in the range of from about 0.25:1.0 to 2.0:1.0.

In a second aspect, this invention is a primer which comprises a solution of:

(a) 5–50% of a polyester resin of a carboxylic acid and a glycol;
 (b) 5–50% of a polymethylene poly(phenyl isocyanate), diphenylmethane diisocyanate, or mixture thereof;
 (c) 0.1–50% of a silane-containing moiety;
 (d) 0.1–50% of a high boiling polar solvent;
 (e) 10–70% of an oxygenated solvent; and
 (f) 1–50% of an aromatic solvent.

Herein "%" refers to the weight percent the named species contributes to the total primer weight, unless noted otherwise.

It has been discovered that the primer of the invention advantageously provides improved adhesion characteristics of metal-to-glass bonding when used to prime acid resistant paint-coated metal substrates before the application of a urethane adhesive, particularly when used with a "fast cure" adhesive comprised of an isocyanate-functional prepolymer and dimorpholinediethyl ether. However, the primer of the invention may also be used to prime other types of surfaces for use with other adhesive types. These and other advantages of this invention are apparent from the following description.

DETAILED DESCRIPTION OF THE INVENTION

The primer of the invention is a liquid mixture, which preferably has a density of about 8 lb/gal before application. After application, the mixture forms a tenacious coating upon solvent evaporation, and completely cures upon exposure to atmospheric moisture.

The polyester resin of a carboxylic acid and a glycol component of the primer (hereafter "polyester resin") is a polymer of a carboxylic acid and a glycol. The polyester resin preferably has a molecular weight of about 15,000 to about 25,000 and has a glass transition temperature preferably in the range of about 65° C. to about 70° C. This polyester resin is preferably a polymer of at least one aromatic dicarboxylic acid or alkyl ester thereof, and at least one glycol compound. The preparation of these polyester resins is described, for example, in U.S. Pat. No. 3,459,584, column 2, line 40 to column 4, line 3; and U.S. Pat. Nos. 4,020,049 and 4,418,183, which are hereby incorporated by reference in their entirety. Preferred aromatic dicarboxylic acids include 1,3-benzenedicarboxylic acid and 1,4-benzenedicarboxylic acid. Preferred glycols include 1,2-ethanediol. Especially preferred is Vitel ™ PE-200, a polyester resin with a molecular weight of about 20,000 sold by the Goodyear Tire and Rubber Co.

The polymethylene poly(phenyl isocyanate), diphenylmethane diisocyanate, or mixture thereof (hereafter "polyisocyanate") is a polyisocyanate which preferably has an NCO equivalent weight of at least about 130, more preferably at least about 133, and most preferably at least about 140; and is preferably no greater than about 500, more preferably no greater than about 300, and most preferably no greater than about 150. The average number of isocyanate groups per molecule of polyisocyanate is preferably at least about 2.4, and more preferably at least about 2.7, and most preferably at least about 3.0; and is preferably no greater than about 5.0, more preferably no greater than about 4.0, and most preferably no greater than about 3.5. Preferably, the polyisocyanate comprises a mixture of polymethylene poly(phenyl isocyanate) and diphenylmethane diisocyanate. More preferably, the polymethylene poly(phenyl isocyanate) is present in an amount of at least about 10% of the polyisocyanate mixture, on a weight basis. Examples of suitable polyisocyanates include PAPI TM 20, PAPI TM 27, and PAPI TM 580, sold by The Dow Chemical Company, Lupranate TM M200, sold by BASF Corporation Chemicals Division, and PBA-2257 and PBA-2262, sold by ICI.

In addition, derivatives of 4,4'-diphenylmethane diisocyanate which are liquid at room temperature such as, for example, polyisocyanates which have carbodiimide groups in their backbone or mixtures thereof may also be used. The preparation of these materials is disclosed in U.S. Pat. No. 3,152,162, which is hereby incorporated by reference in its entirety. An example of a commercial material of this type is Isonate TM 143L Isocyanate, a product of The Dow Chemical Company.

Suitable silane-containing moieties comprise those having moisture curable alkoxysilane groups. One method for preparing such moieties comprises combining a polyisocyanate and an organosilane such as an amino- or mercapto-alkoxysilane of the formulae:

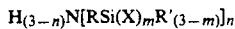

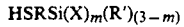

wherein R is a divalent organic moiety, preferably an alkylene, more preferably methylene, ethylene, propylene, or butylene; and most preferably proplyene. R' is preferably hydrogen or an alkyl moiety, more preferably hydrogen, methyl, ethyl, propyl, or butyl; and most preferably methyl. X is preferably a hydrolyzable alkoxy moiety, more preferably methoxy, ethoxy, propoxy, or butoxy; and most preferably methoxy. m is an integer from 1 to 3, preferably 3; and n is 1 or 2, preferably 2. It is evident from the formulae that primary and secondary monoamines as well as mercaptans fall within the definition of these formulae. Preferred moieties for combination include gamma-mercaptopropyltrimethoxysilane and N,N-bis[(3-trimethoxysilyl)propyl]amine. The polyisocyanate used in preparing the silane-containing moiety suitably has two isocyanate groups per moiety and is combined with an amount of primary aminosilane, secondary aminosilane, or mercaptosilane to provide at least one unreacted isocyanate group per moiety in the resulting product. A preferred silane-containing moiety is prepared by reacting one mole of Desmodur N-100 TM with one mole of gamma-mercaptopropyltrimethoxysilane in a 70% solution of methylethyl ketone. Desmodur N-100, supplied by Miles, Inc., is a triisocyanate prepared by reacting three moles of hexamethylene diisocyanate with one mole of water.

The silane-containing moiety is preferably present at 0.1 to 50%. More preferably, the silane-containing moiety is present at 2.0 to 20.0%, and most preferably at 5.0 to 10.0%.

The polyester resin and the polyisocyanate are combined in a manner such that the weight ratio of (a):(b) is preferably at least about 0.25:1.0, more preferably at least about 0.33:1.0, and most preferably at least about 0.5:1.0; and is preferably no greater than about 2.0:1.0, more preferably no greater than about 1.5:1.0, and most preferably no greater than about 1.0:1.0.

In the primer of the second aspect of the invention, the polyester resin preferably comprises at least about 5%, more preferably at least about 7%, and most preferably at least about 8%; and is preferably no greater than about 18%, more preferably no greater than about 13%, and most preferably no greater than about 10%. The polyisocyanate preferably comprises at least about 6%, more preferably at least about 8%, and most preferably at least about 10%; and is preferably no greater than about 17%, more preferably no greater than about 15%, and most preferably no greater than about 13%. The silane-containing moiety is preferably present at 0.1 to 50%. More preferably, the silane-containing moiety is present at 2.0 to 20.0%, and most preferably at 5.0 to 10.0%.

The solvent mixture component of the primer of this invention is preferably anhydrous to prevent the isocyanate from reacting with any water present. Preferably the solvent mixture component of the primer of this invention comprises:
 (i) a high boiling polar solvent;
 (ii) an oxygenated solvent; and
 (iii) an aromatic solvent.

Examples of suitable high boiling polar solvents include N-methyl pyrrolidone, dimethyl formate, and dimethyl sulfoxide. Preferably, the high boiling polar solvent is N-methyl pyrrolidone. Suitable oxygenated solvents include methylethylketone, methyl acetate, ethyl acetate, cyclohexanone, and tetrahyrofuran. Preferably the oxygenated solvents are methylethylketone, ethyl acetate, and tetrahydrofuran; more preferably methylethylketone and ethyl acetate, and most preferably methylethylketone. Suitable aromatic solvents include toluene, xylene, monochlorobenzene and benzene. Preferably the aromatic solvents are toluene, xylene, and monochlorobenzene, more preferably toluene and xylene, and most preferably toluene. The high boiling solvent is preferably used in an amount of at least about 0.1%, more preferably at least about 2.0%, and most preferably at least about 5.0%; and is preferably no greater than about 25.0%, more preferably no greater than about 17.0%, and most preferably no greater than about 10.0%.

The oxygenated solvent is preferably used in an amount of at least about 10.0%, more preferably at least about 20.0%, and most preferably at least about 30.0%; and is preferably no greater than about 70.0%, more preferably no greater than about 60.0%, and most preferably no greater than about 40.0%.

The aromatic solvent is preferably used in an amount of at least about 1.0%, more preferably at least about 2.0%, and most preferably at least about 5.0%; and is preferably no greater than about 50.0%, more preferably no greater than about 30.0%, and most preferably no greater than about 10.0%.

Catalysts which promote the reaction of the polyisocyanate with atmospheric moisture and with active hydrogen groups present on the primed substrate may also be included in the primer of the invention and include, for example, a stannous or stannic compound, such as a stannous salt of a carboxylic acid (e.g., stannous octoate, stannous oleate, stannous acetate, and stannous laurate), a trialkyltin oxide, a dialkyltin dicarboxylate (e.g., dibutyltin dilaurate, dibutyltin diacetate, diethyltin diacetate, and dihexyltin diacetate), a dialkyltin dihalide, or a dialkyltin oxide, such as di-2-ethylhexyltin oxide or dioctyltin dioxide, a tertiary amine, or a tin mercaptide. Tertiary amine catalysts include trialkylamines (e.g., trimethylamine, triethylamine), heterocyclic amines, such as N-alkylmorpholines (e.g., N-methylmorpholine, N-ethylmorpholine, dimethyldiaminodiethyl ether), 1,4-dimethylpiperazine, triethylenediamine and aliphatic polyamines, such as N,N,N',N'-tetramethyl-1,3-butanediamine. Preferably, the catalyst is an organic tin compound such as dibutyltindilaurate.

Carbon black may also be added to the primer of the invention to modify the rheological properties of the primer, such as viscosity, sag resistance, and flow rate. When carbon black is employed, it is preferably used in an amount of at least about 0.5%, more preferably at least about 1.0%, and most preferably at least about 2.0%; and is preferably no greater than about 5.0%, more preferably no greater than about 4.0%, and most preferably no greater than about 3.0%.

Other fillers and additives which may also be used to modify the rheological properties of the primer include, for example, surface-treated fumed silicas, titanium dioxide, calcium carbonate, talc, defoaming agents, mica, aluminum oxide, clays, and glass phenolic, or aluminum oxide bubbles. Such fillers and additives are preferably anhydrous, or dried before use in order to prevent the reaction of any moisture present with the isocyanate. When talc is added it is preferably used in an amount of at least about 3%, and more preferably at least about 6%; and is preferably no greater than about 15%, and more preferably no greater than about 12%.

Additives which stabilize the free isocyanate groups present in the primer are also preferably employed. Such additives include, for example, diethyl malonate, which is preferably employed in an amount of at least about 0.02%, more preferably at least about 0.10%, and most preferably at least about 0.50%; and is preferably no greater than about 5.0%, more preferably no greater than about 2.5%, and most preferably no greater than about 1.5%.

In preparing and storing the primer, it is desirable to minimize the moisture content of the primer, to prevent the free isocyanate groups from reacting with water. Additives which may be employed to reduce the free water content of the primer include, for example, molecular sieves which preferably have a pore diameter of about 3 Å. These molecular sieves are preferably added in an amount of at least about 0.01%, and more preferably at least about 0.03%; and are preferably no greater than about 1.0%, and more preferably no greater than about 0.1%.

The primer of the invention may be used to prime a substrate for use with any one-component or two-component adhesive by applying at least one coat of the primer to the substrate prior to applying an adhesive. The primer of the invention is especially well adapted for use with a urethane adhesive, particularly a moisture-curable urethane adhesive, and more particularly a "fast cure" urethane adhesive comprised of an isocyanate-functional prepolymer and dimorpholinediethyl ether, of the type which is described, for example, in U.S. Pat. Nos. 4,758,648 and 4,780,520, which are hereby incorporated by reference in their entirety. Other urethane sealants which may be used with the primer of the invention include, for example, sealants of the type described in U.S. Pat. Nos. 3,707,521, 3,779,794, 4,624,996, 4,625,012, 4,758,648, and 4,719,267, which are hereby incorporated by reference in their entirety. The primer of the invention may be used to prime any type of substrate, but is especially well adapted for use with a painted substrate such as, for example, a metal substrate coated with an acid resistant paint system.

ILLUSTRATIVE EMBODIMENTS

The following examples are given to illustrate the invention and should not be interpreted as limiting it in any way.

EXAMPLE 1

Silane-Containing Moiety Preparation

Desmodur N-100(207.3 g) is combined with 72.5 g of gamma-mercaptopropyltrimethoxysilane in the presence of 0.08 g of dibutyltindilaurate catalyst at 85° C. for about 2 hours under anhydrous conditions thereby producing an isocyanatosilane. To this solution 120.0 g of methylethyl ketone is added to produce a 70% solution having a 7.7% by weight isocyanate content. Desmodur N-100, supplied by Miles Inc., is a triisocyanate prepared by reacting three moles of hexamethylene diisocyanate with one mole of water.

EXAMPLE 2

Preparation of Primer for Acid Resistant Coatings

Vitel TM PE-200 polyester resin (282.5 g) and 730.6 g of anhydrous methyl ethyl ketone (MEK) are placed in a gallon size ball mill which is then placed on a rolling machine for about 30 minutes, or until the polyester resin is completely dissolved in the MEK. Dried talc (265.1 g), dried carbon black (66.6 g), and a 3 Å molecular sieve powder (1.2 g) are added to the ball mill and ground for about 16 hours. PAPI TM 20 polyisocyanate (482.9 g), toluene (148.1 g), the silane-containing moiety prepared in Example 1 (237.7 g), diethyl malonate and (11.8 g), N-methyl pyrrolidone (279.4 g) are added and then mixed for 10 minutes. A mixture of 5.2 g of dibutyltin dilaurate and 288.9 g of anhydrous methyl ethyl ketone is added to the ball mill and mixing continued for 30 minutes. The resulting primer is stored in cans and glass bottles, the head space of which is filled with nitrogen.

What is claimed is:
1. A primer comprising a solution of:
  (a) a polyester resin of a carboxylic acid and a glycol;
  (b) a polymethylene poly(phenyl isocyanate), diphenylmethane diisocyanate, or mixture thereof; and
  (c) a silane-containing moiety;
in a solvent mixture comprising:
  (i) a high boiling polar solvent;
  (ii) an oxygenated solvent; and
  (iii) an aromatic solvent;
wherein the weight ratio of (a):(b) is in the range of from about 0.25:1.0 to 2.0:1.0.

2. The primer of claim 1 wherein the weight ratio of (a):(b) is at least about 0.33:1.0.

3. The primer of claim 1 wherein the weight ratio of (a):(b) is at least about 0.5:1.0.

4. The primer of claim 1 wherein the weight ratio of (a):(b) is no greater than about 1.0:1.0.

5. The primer of claim 1 wherein the weight ratio of (a):(b) is no greater than about 1.5:1.0.

6. The primer of claim 1 wherein the polyester resin of a carboxylic acid and a glycol is a polymer of 1,3-benzenedicarboxylic acid, 1,4-benzenedicarboxylic acid and 1,2-ethanediol.

7. The primer of claim 1 wherein component (b) comprises at least one diphenylmethane diisocyanate.

8. The primer of claim 7 wherein component (b) comprises a mixture of polymethylene poly(phenyl isocyanate) and diphenylmethane diisocyanate.

9. The primer of claim 1 wherein the high boiling polar solvent is N-methyl pyrrolidone.

10. The primer of claim 1 wherein the silane-containing moiety is prepared by combining a triisocyanate and gamma-mercaptopropyltrimethoxysilane.

11. The primer of claim 1 wherein the silane-containing moiety is prepared by combining a triisocyanate and gamma-mercaptopropyltrimethoxysilane and the high boiling polar solvent is N-methyl pyrrolidone.

12. The primer of claim 1 further comprising an organotin catalyst.

13. The primer of claim 1 wherein the average number of isocyanate groups per molecule of polyisocyanate is in the range of from about 2.4 to about 5.0.

14. A primer comprising a solution of:
  (a) 5–50% of a polyester resin of a carboxylic acid and a glycol;
  (b) 5–50% of a polymethylene poly(phenyl isocyanate), diphenylmethane diisocyanate, or mixture thereof;
  (c) 0.1–50% of a silane-containing moiety;
  (d) 0.1–50% of a high boiling polar solvent;
  (e) 10–70% of an oxygenated solvent; and
  (f) 1–50% of an aromatic solvent.

15. The primer of claim 14 wherein the % of component (a) is at least about 7.

16. The primer of claim 14 wherein the % of component (b) is at least about 8.

17. The primer of claim 14 wherein the % of component (b) is no greater than about 15.

18. The primer of claim 14 wherein the % of component (b) is no greater than about 13.

19. The primer of claim 14 wherein the polyester resin of a carboxylic acid and a glycol is a polymer of 1,3-benzenedicarboxylic acid or 1,4-benzenedicarboxylic acid, and 1,2-ethanediol or ethylene glycol.

20. The primer of claim 14 wherein component (b) comprises at least one diphenylmethane diisocyanate.

21. The primer of claim 14 wherein component (b) comprises a mixture of polymethylene poly(phenyl isocyanate) and diphenylmethane diisocyanate.

22. The primer of claim 14 further comprising an organotin catalyst.

23. The primer of claim 14 wherein the average number of isocyanate groups per molecule of polyisocyanate is in the range of from about 2.4 to about 5.0.

24. The primer of claim 14 wherein the high boiling polar solvent is N-methyl pyrrolidone.

25. The primer of claim 14 wherein the silane-containing moiety is prepared by combining a triisocyanate and gamma-mercaptopropyltrimethoxysilane.

26. The primer of claim 14 wherein the silane-containing moiety is prepared by combining a triisocyanate and gamma-mercaptopropyltrimethoxysilane and the high boiling polar solvent is N-methyl pyrrolidone.

* * * * *